3,367,933
PROCESS FOR THE PRODUCTION OF
7-AMINOCEPHALOSPORANIC ACID
Stephen Eardley, Ruislip, England, Michael Edgar Hall, Swansea, Wales, and John Francis Oughton, Gerrards Cross, and Peter John May, North Harrow, England, assignors to Glaxo Laboratories Limited, Greenford, England, a British company
No Drawing. Continuation of application Ser. No. 267,928, Mar. 26, 1963. This application July 19, 1966, Ser. No. 566,387
Claims priority, application Great Britain, Mar. 28, 1962, 11,874/62
5 Claims. (Cl. 260—243)

This application is a continuation of application Ser. No. 267,928, filed Mar. 26, 1963.

This invention is concerned with the production of 7-aminocephalosporanic acid from cephalosporin C and salts thereof.

7-aminocephalosporanic acid (7-ACA) is a product produced by the hydrolysis of cephalosporin C and may be used as an intermediate for the production of N-acyl analogues of cephalosporin C.

It is an object of the present invention to provide improved processes for the production of 7-aminocephalosporanic acid from cephalosporin C which enable the desired compound to be obtained in good yield and high purity.

According to the invention, therefore, there is provided an improved process for the production of 7-aminocephalosporanic acid from cephalosporin C or a salt thereof which comprises subjecting cephalosporin C or a salt thereof to the action of nitrosyl chloride in a mixed solvent medium comprising formic acid and an inert diluent, as herein defined, and decomposing the resultant intermediate with a compound containing an active hydrogen atom, e.g. a hydroxylic compound, to form 7-aminocephalosporanic acid.

The expression "inert diluent" is used herein to define organic solvents having the following characteristics:

(i) Substantial inertness to nitrosyl chloride and cephalosporin C;

(ii) substantial inability to yield anions in solution in formic acid; and (iii) substantial inability to discharge carbonium ions.

If the diluent is unable to fulfill the conditions, diminished yields may result as compared with the use of nitrosyl chloride in a liquid medium consisting of formic acid alone. For example, dimethylformamide may combine with carbonium ions and this would lead to diminished yields. On the other hand if the diluent is able to fulfill these conditions improved yields as compared with the use of a liquid medium consisting of formic acid alone can be obtained.

The relative proportions of the solvents in the mixed solvent medium will depend on the nature of the inert diluent, although, in general, proportions of 0.25:1 to 2:1, preferably 0.25:1 to 1.5:1 (v./v.) of inert diluent: formic acid may be used. In many cases a ratio of 1:1 will be found to be satisfactory. If too much inert diluent is present it may suppress the ionizing power of the formic acid thus leading to a reduced instead of an enhanced yield.

The term "inert diluent" as used herein comprises various types of solvents including hydrocarbons and nitrohydrocarbons. Hydrocarbons which may be used include alkanes, e.g. in the form of petroleum fractions, and aromatic hydrocarbons e.g. benzene, toluene and the xylenes. Nitrohydrocarbons which may be used include nitroalkanes e.g. nitromethane, nitroethane, 1-nitropropane and 2-nitropropane and nitro-aromatic compounds e.g. nitrobenzene. Other solvents which may be used include halogenated hydrocarbons, particularly those which contain both hydrogen and halogen atoms e.g. dichloromethane, chloroform and 1,2-dichloroethane and alkyl nitriles e.g. acetonitrile.

Some of the inert diluents, particularly those which are only slightly polar, are not freely miscible with formic acid. This may not be disadvantageous, since the inert diluent may extract the nitrosyl chloride into its phase and permit a slower and more easily controlled reaction in the other phase. This in turn may prevent excessive reaction with the nitrosyl chloride. However, in general, we prefer that the diluent should form a single liquid phase with the formic acid.

An important advantage arising from the use of miscible inert diluents is that it enables the reaction to be effected at a lower temperature than would be possible with the use of formic acid alone. Whilst the hydrolytic process according to the invention can be carried out at temperatures up to about 60° C., we prefer to operate at a temperature between −20° and +10° C., particularly between −5° and +5° C.

The nitrosyl chloride should preferably be used in excess although there is no advantage to be gained in using a large excess since this will only have to be destroyed subsequently. In general we prefer to use 1.5–3.0 molecular equivalents of nitrosyl chloride.

One may use free nitrosyl chloride or nitrosyl chloride prepared in situ e.g. from an alkyl nitrite and hydrogen chloride.

A further advantage of the above process is that it can be modified in its operation to avoid or reduce disadvantages inherent in the use of formic acid by itself. Thus the reaction of nitrosyl chloride with a solution of cephalosporin C in formic acid is very vigorous and is accompanied by much foaming and gas evolution. We have found that this disadvantage can be substantially reduced by adding a solution of nitrosyl chloride in the inert diluent to a solution of cephalosporin C in a mixture of formic acid and inert diluent. Alternatively the cephalosporin C may be dissolved in formic acid, the nitrosyl chloride in the inert diluent and the two solutions added simultaneously or intermittently to a mixture of formic acid and inert diluent. The addition can be effected over a period of, for example, five minutes and the reaction mixture allowed to stand for, say, a further ten minutes without untoward side reactions occurring. One is therefore enabled not only to avoid the disadvantages attending a vigorous reaction but also to exercise greater control over the reaction. These factors are important in large scale manufacture.

If the nitrosyl chloride is prepared in situ it may be necessary to dissolve the precursors in different solvents to those which one would choose for pre-prepared nitrosyl chloride. Thus we prefer to dissolve the latter in inert diluent but, for example, when forming nitrosyl chloride from iso-amyl nitrite and hydrogen chloride we prefer to dissolve the precursors in the formic acid.

The product obtained after reaction of the nitrosyl chloride with cephalosporin C is an intermediate which can be converted to 7-aminocephalosporanic acid by reaction with a compound containing an active hydrogen atom e.g. water.

However, it has been found that said intermediate, whether obtained by the process according to the invention or otherwise, can be converted to 7-aminocephalosporanic acid in improved yield and/or increased purity by dissolving the intermediate, either in solution in a dissolved form or in a substantially solvent-free state, in a relatively large volume of a lower alkanol and then adding a base to precipitate the 7-aminocephalosporanic acid.

By proceeding in this maner the desired end product can be obtained as a white precipitate which can readily be filtered off, washed and dried to yield a product of high yield and purity.

Accordingly, the invention also provides a process for the production of 7-aminocephalosporanic acid from the intermediate arising from the reaction of cephalosporin C or a salt thereof with a nitrosating agent, preferably nitrosyl chloride, which comprises decomposing said intermediate with a lower alkanol and adding a base to precipitate the 7-aminocephalosporanic acid from the resultant solution.

Whilst this further process according to the invention can lead to an improved yield of 7-ACA derived from other processes involving the use of nitrosating agents (e.g. the use of nitrosyl chloride in a liquid medium consisting only of formic acid) it is preferred to employ it in conjunction with the hydrolytic process according to the invention involving the use of an inert diluent since improved yields can be obtained which cannot be explained on an additive basis.

The lower alkanol used is preferably methanol. Whilst ethanol, propanol, etc. can be used, the yields obtained are not in general so good as those obtained with methanol which is the alkanol of choice.

The lower alkanol is preferably used in an amount of from 12 ml. to 130 ml. per gram of cephalosporin C starting material calculated as the sodium salt dihydrate. Advantageously one uses 60–75 ml. of lower alkanol per gram of cephalosporin C on the stated basis.

The isoelectric point of 7-aminocephalosporanic acid in water is circa 3.5 and whilst pH's above or below this figure may be used, we find that optimal results are obtained in methanol by adjusting the pH with the base to circa 3.5. A preferred pH range is 2.5 to 4.5. pH's referred to in connection with isoelectric point are as measured directly on the solution using a glass electrode.

The base used to precipitate the 7-ACA is conveniently a concentrated solution of ammonia in a solvent such as water or methanol. The 7-ACA can be recovered from the alkanolic solution using very little ammonia and consequently little ammonium formate is formed. We have found that concentrated solutions of ammonium formate increase the solubility of 7-ACA in water and hence, as compared with recovery of 7-ACA from an aqueous solvent medium, one is able to obtain increased yields by the process according to the invention by avoiding losses due to solubilization of 7-ACA.

The 7-ACA obtained by the use of a lower alkanol followed by addition of a base is washed and dried. It may be used without further purification for conversion into other compounds.

In order that the invention may be well understood the following examples are given by way of illustration only. Unless otherwise stated measurements of ultraviolet absorption were made on solutions in 0.01 N-hydrochloric acid.

Example 1

Solutions of cephalosporin C sodium salt, dihydrate (4 g.) in 98% formic acid (25 ml.) and nitrosyl chloride (1.11 g.; 2 equivalents) in nitromethane (25 ml.) were run at $-3°$ with stirring, into a vessel over a period of 9.5 minutes. The mixture was stirred for a further 2 minutes and the solvents then evaporated on a rotary evaporator with a bath temperature of 50° C. The resulting gum was dissolved in water (20 ml.) and the solution (pH 1.0) was adjusted to pH 3.5 by the addition of 7.5 N-ammonia solution. The precipitated 7-ACA was allowed to stand at 0° for one hour and was then collected, washed with water, and dried (925 mg., 40%; λ max. 260 m$\mu$; ε 7,800).

The reaction was repeated in Examples 2–6 except that 3 equivalents (1.66 g.) (cf. Example 9) of nitrosyl chloride were used and instead of nitromethane, the following solvents nitroethane, 1-nitropropane, 2-nitropropane, acetonitrile and dichloromethane were used. The results obtained are shown in Table 1.

TABLE 1.—REACTIONS IN VARIOUS SOLVENT MIXTURES

| Example | Solvent added to formic acid | Time of Addition, min. | Temperature, ° C. | Yield, mg. | λ max. at 260 m$\mu$ | Yield of 7-ACA, percent |
|---|---|---|---|---|---|---|
| 2 | Nitroethane | 21.5 | −2 | 912 | 7,534 | 39 |
| 3 | 1-nitropropane | 11.5 | −2 | 841 | 7,534 | 36 |
| 4 | 2-nitropropane* | 15.75 | −2.5 | 861 | 7,371 | 37 |
| 5 | Acetonitrile | 9 | 6 | 752 | 7,698 | 32 |
| 6 | Dichloromethane | 11.5 | −2 | 840 | 7,942 | 36 |

*Solutions of NOCl in 2-nitropropane should be used immediately as reaction between the two appears to occur.

Example 7

Solutions of cephalosporin C sodium salt, dihydrate (4 g.) in 98% formic acid (25 ml.) and nitrosyl chloride (1.66 g.; 3 equivalents) in benzene (25 ml.) were mixed with stirring (see Example 1) over a period of 12 minutes at 10°. The mixture was stirred for a further 2 minutes then allowed to separate into two phases. The lower phase was evaporated on a rotary evaporator with a bath temperature 50°. The resulting gum was dissolved in water (20 ml.) and the solution (pH 0.9) was adjusted to pH 3.5 by the addition of 7.5 N-ammonia solution. The precipitated 7-ACA was allowed to stand at 0° for 1 hour and was then collected, washed with water, and dried (765 mg., 33%; λ max. 260 m$\mu$, ε 7,500).

Example 8

A solution of cephalosporin C sodium salt, dihydrate (4 g.) in 98% formic acid (25 ml.) and nitromethane (25 ml.) and another of nitrosyl chloride (1.66 g. 3 equivalents) in petroleum-ether (B.P. 40–60°) (25 ml.) were run together with stirring into a vessel over a period of 24 minutes at $-7°$ (see Example 1). The mixture was stirred for a further 2 minutes, and allowed to separate into two phases. The lower phase was evaporated on a rotary evaporator with a bath temperature of 50°. The resulting gum was dissolved in water (20 ml.) and the solution (pH 0.95) was adjusted to pH 3.5 by the addition of 7.5 N-ammonia solution. The precipitated 7-ACA was allowed to stand at 0° for 1 hour and was then collected, washed with water, and dried (917 mg.; 39%; λ max. 260 m$\mu$, ε 8,000).

Example 9

Solutions of cephalosporin C sodium salt, dihydrate (4 g.) in 98% formic acid (25 ml.) and nitrosyl chloride (1.66 g.; 3 equivalents) in nitromethane (25 ml.) were added to a mixture of formic acid (15 ml.) and nitromethane (35 ml.) with stirring over a period of 12.5 minutes at $-2°$ (see Example 1). The mixture was stirred for a further 2 minutes and the solvents then evaporated on a rotary evaporator with a bath temperature of 50°. The resulting gum was dissolved in water (20 ml.) and the solution (pH 1.2) was adjusted to pH 3.5 by the addition of 7.5 N-ammonia solution. The precipitated 7-ACA was allowed to stand at 0° for one hour, and was then collected, washed with water, and dried (882 mg., 37%; λ max. 260 m$\mu$, ε 8,050).

Example 10

A solution of cephalosporin C sodium salt, dihydrate (5 g.) in formic acid (98–100%; 20 ml.) was stirred and cooled to +3° in a cooling bath at −10°. Nitrosyl chloride (1.75 ml.) was added dropwise from a refrigerated dropping funnel over a period of two minutes, during which time the temperature rose to 26° and there was a copious evolution of gas. After the mixture had been stirred for a total of five minutes it was poured into dry methanol (100 ml.) and the pH of the solution adjusted to 3.6 with 7.5 N-ammonium hydroxide, when 7-aminocephalosporanic acid precipitated. After being cooled the mixture was filtered and the white solid washed with methanol. The yield of 7-ACA was 1.03 g. (34%, λ max. 260 m$\mu$, ε 8000).

Example 11

A solution of cephalosporin C sodium salt, dihydrate (5 g.) in formic acid (98–100%; 20 ml.) was cooled to +3° in a cooling bath at −10° and stirred whilst nitrosyl chloride (1.75 ml.) was added dropwise from a refrigerated dropping funnel over a period of two minutes. After a total time of five minutes the solution was rapidly evaporated on a rotary evaporator and the residual gum dissolved in dry methanol (100 ml.). Addition of 7.5 N-ammonium hydroxide to pH 3.6 caused precipitation of 7-ACA (1.16 g.; 40%, λ max. 260 m$\mu$, ε 7700).

Example 12

Treatment of cephalosporin C sodium salt, dihydrate (5 g.) with nitrosyl chloride and evaporation of the reaction mixture exactly as in Example 11 gave a gum, which was dissolved in dry methanol (50 ml.). Adjustment of the pH of this solution to 3.6 with methanolic ammonia gave 7-ACA (1.3 g., 45%), λ max. 260 m$\mu$ (ε 7,700).

Example 13

Cephalosporin C, sodium salt, dihydrate (30 g., 91.0% purity) was dissolved in formic acid (188 ml., 98–100%) and nitromethane (125 ml.) added to this with stirring. The stirred reaction mixture was cooled to −5° and a solution of nitrosyl chloride (7 ml.) in nitromethane (63 ml.) added dropwise over 6 mins. The temperature during the reaction was kept between −5° and 0°. After the addition of the nitrosyl chloride solution, the reaction mixture was stirred for a further 14 mins. at the same temperature and then poured into methanol (3 litres) with stirring. After 10 mins. this solution was adjusted to pH 3.5 with ammonium hydroxide solution (s.g. 0.88) and the precipitate filtered off. This was washed with methanol (3×30 ml.) and then with ether (3×30 ml.) and finally dried at 40° under vacuum. Yield 9.92 g. (63.2% theory).

This compound travels as a single spot on electrophoresis at pH 1.9 in an identical manner to 7-ACA, and gives an identical ninhydrin colour reaction to this authentic specimen. U.V. λ max. 260 m$\mu$, ε 8440.

Example 14

Example 13 was repeated but the reaction mixture was poured into ethanol (I.M.S.) instead of methanol, the yield obtained in this case being 56.8%, λ max. 260 m$\mu$, ε 7300.

Example 15

Example 13 was repeated but the mixture poured into n-propanol instead of methanol. The yield was 44.3%, λ max. 260 m$\mu$, ε 6,890.

Example 16

Cephalosporin C sodium salt, dihydrate (24 g., 91.0% purity) was dissolved in formic acid (50 ml., 98–100%) and the solution cooled to 0° C. Then nitrosyl chloride (5.4 ml.) was dissolved in acetonitrile (50 ml.) at −10° C. These two solutions were added to a stirred mixture of formic acid (70 ml.) and acetonitrile (70 ml.) at equal rates over 13 mins., the reaction mixture being kept between −5 and +5° C.

After stirring for a further 5 mins. the reaction mixture was poured into methanol (2 litres) and the solution adjusted to pH 3.5 with ammonium hydroxide solution (s.g. 0.88). The precipitate was filtered off and washed with methanol (2×75 ml.), ether (2×50 ml.) and finally dried under vacuum overnight at room temperature. Yield of 7-ACA 6.67 g. (54%) U.V. λ max. 259 m$\mu$, ε 7,896.

Example 17

Cephalosporin C sodium salt, dihydrate (30 g., 91% purity) was dissolved in cold formic acid (94 ml.), diluted with dichloromethane (63 ml.) and stirred at −3° while a solution of nitrosyl chloride (7 ml.) in dichloromethane (31 ml.) was added dropwise during 5 minutes. After a further 5 minutes the reaction solution was poured into methanol (2 litres) and the pale yellow solution was titrated to pH 3.5 with ammonium hydroxide solution (s.g. 0.88). The resultant suspension was cooled to 10°, the precipitate was collected by filtration, washed with methanol (100 ml.) and diethyl ether (100 ml.) and dried in vacuo at 40° to give a 54.3% yield (8.55 g.) of 7-ACA U.V. λ max. 259 m$\mu$, ε 8,090.

Example 18

Cephalosporin C sodium salt, dihydrate (88% purity, 30.0 g.) in formic acid (188 ml., water content 0.8%) and dichloromethane (158 ml.) was stirred at −3° with a slow stream of nitrogen passing through the liquid. The solution was treated with a cooled solution of nitrosyl chloride (7.0 ml.) in dichloromethane (30 ml.) over 8 minutes at 0 to −3°. The reaction mixture was stirred for a further 8 minutes at 0° and then poured into methanol (2 l.). The pH of the clear solution was adjusted to 3.5 with ammonium hydroxide solution (12.0 ml.; s.g. 0.88) and the mixture cooled down to 10° during 40 minutes. The precipitate was filtered off and washed with methanol (90 ml.) and then with ether (60 ml.) by displacement. The pale cream solid was dried at 40° in vacuo to give 7-ACA (8.81 g., 58%), λ max. 260 m$\mu$, ε 7,490.

Example 19

Solutions of cephalosporin C sodium salt, dihydrate (4 g.) in 98%-formic acid (25 ml.) and nitrosyl chloride (1.66 g., 3 equivs.) in nitrobenzene (25 ml.) were mixed with stirring over a period of 9 mins. at 1 to 4°. The mixture was stirred for a further 2 mins. and the formic acid was then evaporated on a rotary evaporator with a bath temperature of 50° over a period of 7 mins. The nitrobenzene was decanted from the residual gum which was dissolved in water (25 ml.). This solution was then shaken with the nitrobenzene layer and separated. The nitrobenzene was washed with more water (5 ml.) and the combined aqueous solutions (pH 1.1) were adjusted to pH 3.5 by addition of 7.5 N-ammonia solution. 7-ACA precipitated as an orange solid and was allowed to stand at 0° for one hour before being collected, washed with water and dried (909 mg., 39.5%), λ max. 260 m$\mu$ (ε 7,780).

Example 20

Cephalosporin C potassium salt (73% purity, 7.38 g.) was added to formic acid (45 ml., water content 0.5%) and dichloromethane (15 ml.) at 0 to 2°. Dichloromethane (21 ml.) was added. Iso-amyl nitrite (4.82 g.) was added to a cooled solution of dry hydrogen chloride (0.86 g.) in formic acid (24.6 ml.) which was then added over 10 minutes to the cephalosporin C solution at 0 to 5°. The reaction mixture was stirred for a further 10 minutes, the temperature rising to 3°, and was poured into methanol (468 ml.) at −4°. After stirring for a further 30 minutes, the pH was adjusted to 3.4 with ammonium hydroxide solution (12.5 ml., s.g. 0.88) and the mixture was stirred for 3 hours at −4°. The precipitate was filtered off and washed with chilled methanol (27 ml.) and ether (9 ml.). The buff coloured solid was dried at 40° in vacuo to give 7-ACA (1.64 g., 51%), λ max. 260 mμ, ε 7,690.

*Example 21*

A stirred mixture of formic acid (375 ml., 98%) and methylene chloride (300 ml.) was cooled to —5° Cephalosporin C calcium salt (60 g.) was added and the mixture stirred for 10 minutes. Nitrosyl chloride (14 ml.) in methylene chloride (75 ml.) was added to the stirred mixture over 8 minutes while the temperature was kept between —2 and 0°. The mixture was kept at this temperature for a further 8 minutes, then poured into methanol (2.5 litres). After the mixture had been standing for 5 minutes, the pH was adjusted to 3.5 with ammonium hydroxide solution (s.g. 0.880). The mixture was allowed to stand in the refrigerator for one hour. It was then filtered, the precipitate washed with methanol (2×50 ml.) and ether (2×50 ml.) and dried under vacuum to give 7-aminocephalosporanic acid (41.2%), λ max. 263 mμ, $E_{1\,cm.}^{1\%}$ 273 (pH 7 phosphate buffer)

*Example 22*

A stirred mixture of formic acid (375 ml., 98%) and methylene chloride (300 ml.) was cooled to —5°. Cephalosporin C potassium salt (60 g.) was added and the mixture stirred for 10 minutes. Nitrosyl chloride (14 ml.) in methylene chloride (75 ml.) was added to the stirred mixture over 8 minutes while the temperature was kept between —2 and 0°. The mixture was kept at this temperature for a further 8 minutes, then poured into methanol (2.5 litres). After the mixture had been standing for 5 minutes, the pH was adjusted to 3.5 with ammonium hydroxide solution (s.g. 0.880). The mixture was allowed to stand in the refrigerator for one hour. It was then filtered, the precipitate washed with methanol (2×50 ml.) and ether (2×50 ml.) and dried under vacuum to give 7-aminocephalosporanic acid (52.2%), λ max. 263 mμ, $E_{1\,cm.}^{1\%}$ 283 (pH 7 phosphate buffer)

*Example 23*

A stirred solution of formic acid (63 ml., 98%) and methylene chloride (43 ml.) was cooled to —3°. Cephalosporin C (free acid) (10 g.) was added and the mixture stirred for 10 minutes. Nitrosyl chloride (2.4 ml.) in methylene chloride (20 ml.) was added to the stirred mixture over 7 minutes and the mixture stirred for a further 8 minutes at between 0 and —2°. The mixture was then poured into methanol (667 ml.). After the mixture had been standing for 5 minutes the pH was adjusted to 3.5 with ammonium hydroxide solution (s.g. 0.880). The mixture was allowed to stand at 0° for one hour. It was then filtered, the precipitate washed with methanol and ether and dried under vacuum to give 7-aminocephalosporanic acid (45.7%), λ max. 260 mμ, $E_{1\,cm.}^{1\%}$ 296

We claim:
1. In a process for the production of 7-aminocephalosporanic acid wherein a cephalosporin compound selected from the group consisting of cephalosporin C and a salt thereof is reacted with nitrosyl chloride in a solvent medium at a temperature of not more than 60° C. the resulting intermediate is decomposed with a compound containing an active hydrogen atom and said 7-aminocephalosporanic acid is precipitated by addition of a base, the steps of carrying out the reaction with nitrosyl chloride in a mixed solvent medium comprising formic acid and an inert diluent selected from the group consisting of a nitroloweralkane, nitrobenzene, a haloloweralkane containing both hydrogen and halogen atoms and a loweralkyl nitrile, and contacting the resulting intermediate with methanol prior to adding said base.

2. A process as claimed in claim 1 in which said inert diluent is nitromethane.

3. A process as claimed in claim 1 in which said inert diluent is methylene chloride.

4. A process as claimed in claim 1 in which said inert diluent is acetonitrile.

5. A process as claimed in claim 1 in which said intermediate is in a substantially solvent-free state prior to contact with methanol.

References Cited
UNITED STATES PATENTS 3,188,311  6/1965  Morin et al. _____ 260—243

NICHOLAS S. RIZZO, *Primary Examiner.*